United States Patent
Benz et al.

(10) Patent No.: US 11,498,017 B2
(45) Date of Patent: Nov. 15, 2022

(54) REFINING SYSTEM

(71) Applicant: Benz Research and Development Corp., Sarasota, FL (US)

(72) Inventors: Patrick H. Benz, Santa Barbara, CA (US); Savannah Abbey Benz, Santa Barbara, CA (US); Andrew A. Larson, Blaine, MN (US)

(73) Assignee: BENZ RESEARCH AND DEVELOPMENT CORP., Sarasota, FL (US)

( * ) Notice: Subject to any disclaimer, the term of this patent is extended or adjusted under 35 U.S.C. 154(b) by 0 days.

(21) Appl. No.: 16/713,842

(22) Filed: Dec. 13, 2019

(65) Prior Publication Data

US 2020/0188811 A1 Jun. 18, 2020

Related U.S. Application Data

(60) Provisional application No. 62/779,924, filed on Dec. 14, 2018.

(51) Int. Cl.
  *B01D 5/00* (2006.01)
  *B01D 1/16* (2006.01)
  (Continued)

(52) U.S. Cl.
  CPC ........ *B01D 5/0042* (2013.01); *B01D 1/0082* (2013.01); *B01D 1/16* (2013.01);
  (Continued)

(58) Field of Classification Search
  CPC ...... B01D 1/0082; B01D 1/16; B01D 5/0042; B01D 5/006; C02F 1/04; C02F 1/043; C02F 1/048
  See application file for complete search history.

(56) References Cited

U.S. PATENT DOCUMENTS

| 587,162 A | 7/1897 | Rosebrook |
| 1,538,254 A | 5/1925 | Mellott |
| | (Continued) | |

FOREIGN PATENT DOCUMENTS

| CN | 104192928 A | 12/2014 |
| FR | 1231811 A | 10/1960 |
| | (Continued) | |

OTHER PUBLICATIONS

International Search Report dated Apr. 3, 2020 in related International Appl. No. PCT/US2019/066293 (11 pgs.).

(Continued)

*Primary Examiner* — Renee Robinson
(74) *Attorney, Agent, or Firm* — Foley & Lardner LLP

(57) ABSTRACT

A refining system includes a Peltier heat exchanger, an evaporation tank, and a nozzle. The Peltier heat exchanger is configured to receive unrefined liquid and comprising a Peltier cell. The nozzle is positioned within the evaporation tank and configured to receive unrefined liquid from the Peltier heat exchanger and provide unrefined liquid into the evaporation tank such that vapor is formed. The Peltier heat exchanger is configured to receive vapor from the evaporation tank while simultaneously receiving unrefined liquid. The Peltier cell is configured to heat unrefined liquid within the Peltier heat exchanger and cool vapor within the Peltier heat exchanger simultaneously.

20 Claims, 10 Drawing Sheets

(51) Int. Cl.
*C02F 1/04* (2006.01)
*B01D 1/00* (2006.01)
C02F 103/08 (2006.01)
F25B 21/02 (2006.01)

(52) U.S. Cl.
CPC .............. *B01D 5/006* (2013.01); *C02F 1/04* (2013.01); *C02F 1/048* (2013.01); *C02F 2103/08* (2013.01); *F25B 21/02* (2013.01); *Y02A 20/124* (2018.01)

(56) References Cited

U.S. PATENT DOCUMENTS

| | | | |
|---|---|---|---|
| 1,595,666 | A | 8/1926 | Knapp |
| 2,554,546 | A | 5/1951 | Zahm |
| 2,971,897 | A | 2/1961 | Chapman |
| 3,212,999 | A | 10/1965 | Sommers, Jr. |
| 3,506,543 | A | 4/1970 | Cross |
| 4,249,989 | A | 2/1981 | Kalmykov et al. |
| 4,276,124 | A | 6/1981 | Mock |
| 5,441,606 | A | 8/1995 | Schlesinger et al. |
| 5,968,321 | A | 10/1999 | Sears |
| 6,375,805 | B1 | 4/2002 | Dableh |
| 6,805,774 | B2 | 10/2004 | Dableh |
| 6,833,056 | B1 * | 12/2004 | Kamiya ............... B01D 1/0052 202/155 |
| 6,893,540 | B2 | 5/2005 | Stout et al. |
| 8,845,865 | B2 | 9/2014 | Batty et al. |
| 9,221,694 | B1 * | 12/2015 | Govindan ............... C02F 1/048 |
| 10,350,508 | B2 | 7/2019 | Campbell et al. |
| 2002/0130029 | A1 | 9/2002 | Stout et al. |
| 2002/0179425 | A1 * | 12/2002 | Dableh ................ B01D 1/0017 203/1 |
| 2005/0115878 | A1 | 6/2005 | Lai |
| 2011/0000777 | A1 | 1/2011 | Zhou |
| 2013/0186741 | A1 | 7/2013 | Batty et al. |
| 2016/0271514 | A1 | 9/2016 | Campbell et al. |

FOREIGN PATENT DOCUMENTS

| | | |
|---|---|---|
| GB | 0 855 458 A | 11/1960 |
| WO | WO-2009/138818 A1 | 11/2009 |
| WO | WO-2018/191517 A1 | 10/2018 |

OTHER PUBLICATIONS

Non-Final Office Action on U.S. Appl. No. 15/951,962 dated Feb. 19, 2020.
U.S. Office Action on U.S. Appl. No. 15/951,962 dated Sep. 28, 2020.
U.S. Office Action on U.S. Appl. No. 15/951,962 dated Jun. 4, 2020.
Final Office Action on U.S. Appl. No. 15/951,962 dated Oct. 8, 2019.
International Search Report and Written Opinion dated Jul. 3, 2018 in related International Appl. No. PCT/US2018/027334 (11 pgs.).
Non-Final Office Action on U.S. Appl. No. 15/951,962 dated Apr. 3, 2019.

* cited by examiner

REFINING SYSTEM

CROSS-REFERENCE TO RELATED APPLICATION

The present application claims the benefit of and priority to, U.S. Provisional Patent Application No. 62/779,924, filed Dec. 14, 2018, which is incorporated herein by reference in its entirety.

TECHNICAL FIELD

The present application relates generally to a refining system.

BACKGROUND

Unrefined liquids may be refined through a boiling process and a subsequent condensation process. First, the liquid is heated to a point at which the liquid shifts into a vapor. In some applications, the liquid is heated in bulk (e.g., in a tank or container, etc.). After vapor is produced, the vapor is condensed into a refined liquid. Producing refined liquid economically may be difficult because the cost of the energy required to heat liquid to produce an amount of refined liquid outweighs, or is a significant portion of, the value of the amount of refined liquid.

One example of an unrefined liquid is water that is not suitable for use (e.g., consumption by humans, etc.), such as salt water. Certain localities and regions may have access to much more unrefined water than refined water and may desire to convert unrefined water into refined water (e.g., for consumption, etc.). This conversion may be attempted using a desalination device. Some desalination devices utilize distillation or reverse osmosis. However, these desalination devices are typically expensive to purchase and expensive to operate. As a result, refined water may be expensive and/or not readily available in some localities.

SUMMARY

In one embodiment, a refining system includes a Peltier heat exchanger, an evaporation tank, and a nozzle. The Peltier heat exchanger is configured to receive unrefined liquid and comprising a Peltier cell. The nozzle is positioned within the evaporation tank and configured to receive unrefined liquid from the Peltier heat exchanger and provide unrefined liquid into the evaporation tank such that vapor is formed. The Peltier heat exchanger is configured to receive vapor from the evaporation tank while simultaneously receiving unrefined liquid. The Peltier cell is configured to heat unrefined liquid within the Peltier heat exchanger and cool vapor within the Peltier heat exchanger simultaneously.

In another embodiment, a method of purifying liquid using a refining system including an evaporation tank and a Peltier heat exchanger having a Peltier cell includes receiving, by the Peltier heat exchanger, unrefined liquid. The method also includes providing, by the Peltier heat exchanger, the unrefined liquid to the evaporation tank. The method also includes receiving, by the Peltier heat exchanger, vapor from the evaporation tank. The method also includes heating, by the Peltier cell, the unrefined liquid within the Peltier heat exchanger while simultaneously cooling, by the Peltier cell, the vapor within the Peltier heat exchanger. The method also includes providing, by the Peltier heat exchanger, refined liquid.

In yet another embodiment, a Peltier heat exchanger for a refining system includes a body, and a module The body includes a Peltier heat exchanger inlet and a Peltier heat exchanger outlet. The Peltier heat exchanger inlet is configured to receive vapor. The Peltier heat exchanger outlet is configured to provide refined liquid. The module includes an internal conduit inlet, an internal conduit outlet, a core body, an internal conduit, an upper heat sink, and a Peltier cell. The internal conduit inlet is configured to receive unrefined liquid. The internal conduit outlet is configured to provide unrefined liquid. The internal conduit is positioned within the core body and configured to receive unrefined liquid from the internal conduit inlet, to provide unrefined liquid to the internal conduit outlet, and to route unrefined liquid within the core body. The upper heat sink is coupled to the core body and configured to interface with vapor. The Peltier cell is disposed between the internal conduit and the upper heat sink. The Peltier cell is configured to simultaneously heat the internal conduit and cool the upper heat sink.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
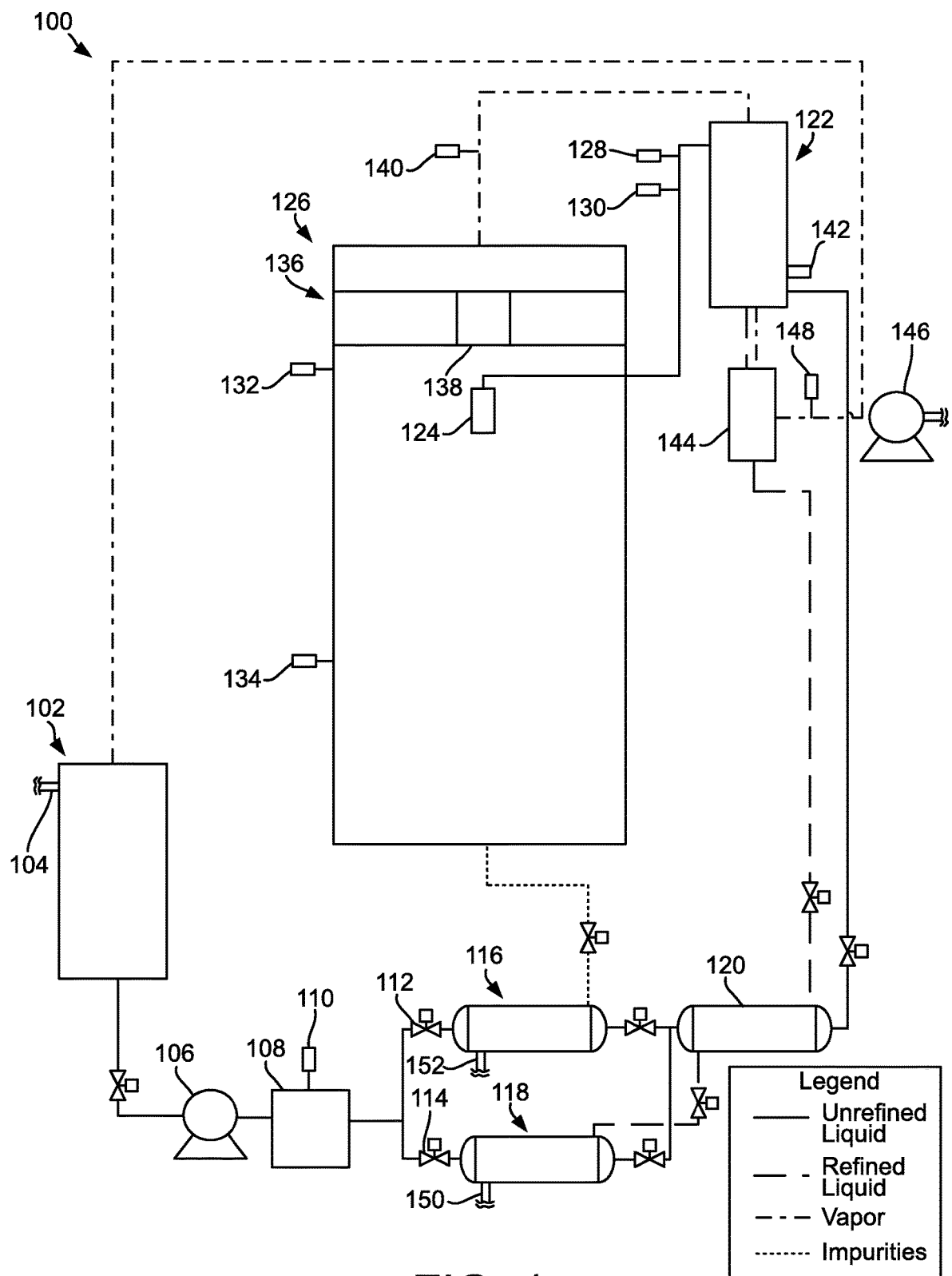
FIG. 1 is a block schematic diagram of an example refining system.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for purifying a liquid. The various concepts introduced above and discussed in greater detail below may be implemented in any of numerous ways, as the described concepts are not limited to any particular manner of implementation. Examples of specific implementations and applications are provided primarily for illustrative purposes.

I. OVERVIEW

A liquid is defined by a boiling point and a heat of vaporization (e.g., enthalpy of vaporization, latent heat of vaporization, heat of evaporation, etc.) that is the amount of energy that must be added to the liquid at the boiling point to transform that liquid into a vapor. In contrast, a vapor is defined by a heat of condensation (e.g., enthalpy of condensation, etc.) that is the amount of energy that is released by a vapor when that vapor transforms into a liquid. In a system that utilizes a boiling process and a subsequent condensing process, 100% efficiency is achieved when the heat of vaporization that must be added to liquid (e.g., a first liquid, etc.) to create vapor equals the heat of condensation that is released by the vapor when the vapor is condensed into liquid (e.g., a second liquid, etc.).

Unrefined liquids are typically refined through a boiling process and a subsequent condensation process which condenses a vapor into a refined liquid. For example, water is typically refined using evaporation, boiling, or time consuming and expensive reverse osmosis techniques. However, a large amount of energy is often wasted in these processes because the heat of vaporization required to boil the liquid is much greater than the amount of energy that is collected from the heat of condensation that is released by the vapor.

Implementations herein relate to a refining system that utilizes a Peltier cell to harness the heat of condensation released by vapor during condensation so as to achieve a higher efficiency than other similar systems which do not utilize a Peltier cell. Implementations herein include a refining device that includes an evaporation tank and a Peltier heat exchanger located outside of the evaporation tank. The Peltier heat exchanger receives unrefined liquid, the Peltier heat exchanger heats the unrefined liquid using a Peltier cell, and the Peltier heat exchanger provides the unrefined liquid to the evaporation tank. The evaporation tank causes vapor to be formed from the unrefined liquid and provides the vapor to the Peltier heat exchanger. While the Peltier cell is heating the unrefined liquid, the Peltier cell simultaneously condenses the vapor into refined liquid, thereby harnessing the heat of condensation of the vapor. Through the use of the Peltier cell in this way, the refining device described herein harnesses the heat of condensation released by the vapor and simultaneously provides the heat of condensation to the liquid, thereby conserving the heat of vaporization of the liquid that formed the vapor and causing the refining system to be capable of operating more efficiently than other devices that do not include Peltier cells or do not utilize a Peltier cell in this fashion.

II. OVERVIEW OF EXAMPLE REFINING SYSTEM

FIG. 1 depicts an example refining system 100. The refining system 100 does not include moving components (e.g., mixers, etc.). The refining system 100 includes an unrefined liquid tank 102. In some embodiments, the unrefined liquid tank 102 is a vacuum degassing tank. The unrefined liquid tank 102 is defined by a volume (e.g., capacity, etc.). In one embodiment, the unrefined liquid tank 102 has a volume of 106 gallons. The unrefined liquid tank 102 includes a tank inlet 104. The tank inlet 104 receives unrefined liquid (e.g., salt water, seawater, unrefined alcohol, unrefined ethyl ether, etc.) from an unrefined liquid source (e.g., ocean, sea, salt lake, salt water tank, unrefined alcohol tank, unrefined ethyl ether tank, etc.). In some embodiments, the tank inlet 104 receives unrefined liquid at a temperature of approximately 20 degrees Celsius (° C.). For example, the tank inlet 104 may receive unrefined water from the sea at a temperature of approximately 20° C. In embodiments where the unrefined liquid is salt water or seawater, the unrefined liquid tank 102 may be a degassing tank.

The refining system 100 includes a plurality of conduits (e.g., pipes, etc.). As will be explained herein, the refining system 100 variously processes (e.g., receives, provides, handles, etc.) unrefined liquid, refined liquid (e.g., drinking water, fresh water, refined alcohol, refined ethyl alcohol, etc.), vapor (e.g., gas, steam, water vapor, alcohol vapor, ethyl ether vapor, etc.), and impurities (e.g., brine, blowby water, blowdown water, sludge, salt, salt concentrate, etc.). FIG. 1 includes a legend indicating whether a conduit primarily processes unrefined liquid, refined liquid, vapor, or impurities based on line style (e.g., solid, dash-dash, dash-dot-dash, dot-dot). It is understood that while, for example, a conduit may be shown with a line style indicating that the conduit primarily processes vapor, the conduit may also simultaneously process refined liquid.

The refining system 100 also includes a unrefined liquid pump 106 (e.g., gear pump, etc.). The unrefined liquid pump 106 is configured to be controlled by a controller to selectively draw unrefined liquid from the unrefined liquid tank 102. The unrefined liquid pump 106 may be, for example, a gear pump, a centrifugal pump, a positive displacement pump, a rotary pump, and other similar pumps.

The unrefined liquid pump 106 provides the unrefined liquid to a unrefined liquid heater 108. The unrefined liquid heater 108 is configured to be controlled (e.g., between an off state and an on state, etc.) by a controller (e.g., the same controller that is configured to control the unrefined liquid pump 106, etc.). The unrefined liquid heater 108 is configured to heat the unrefined liquid received from the unrefined liquid pump 106 when the refining system 100 is first started (e.g., powered on, initialized, etc.). For example, the unrefined liquid heater 108 may be configured to raise the temperature of the unrefined liquid from 20° C. to between 50° C. and 90° C. (e.g., 50° C., 55° C., 60° C., 65° C., 70° C., 75° C., 80° C., 85° C., 90° C., etc.). After the refining system 100 has been started (e.g., has attained steady-state operation, etc.), the unrefined liquid heater 108 is turned off (e.g., powered down, etc.) and ceases to heat the unrefined liquid received from unrefined liquid pump 106. Instead of receiving heat from the unrefined liquid heater 108, the unrefined liquid is heated through only heat recovery from refined liquid and impurities after the refining system 100 has been started. In this way, the unrefined liquid heater 108 functions to pre-heat the unrefined liquid before further heating will be applied to vaporize the unrefined liquid. By turning off the unrefined liquid heater 108 when the refining system 100 has attained steady state, energy consumption of the refining system 100 may be minimized. In some other embodiments, the unrefined liquid heater 108 is configured to operate continuously (e.g., at various energy consumption levels, etc.).

In some embodiments, a first sensor 110 is coupled to the unrefined liquid heater 108 and configured to determine the temperature of the unrefined liquid entering or within the unrefined liquid heater 108. The first sensor 110 may be, for example, a resistance temperature detector (RTD). The first sensor 110 may be configured to provide the temperature of the unrefined liquid within the unrefined liquid heater 108 to a controller (e.g., the same controller that is configured to control the unrefined liquid pump 106, etc.). In some embodiments, the unrefined liquid heater 108 is controlled between the off state and on state based on a temperature of the first sensor 110. For example, when the temperature of the unrefined liquid entering the unrefined liquid heater 108, as determined by the first sensor 110, is less than 80° C., the controller may cause the unrefined liquid heater 108 to be in the on state so as to heat the unrefined liquid, whereas when the temperature of the unrefined liquid entering the unrefined liquid heater 108, as determined by the first sensor 110, is greater than or equal to 80° C., the controller may cause the unrefined liquid heater 108 to be in the off state so as to not heat the unrefined liquid.

The refining system 100 also includes a first valve 112 and a second valve 114. The first valve 112 and the second valve 114 separately receive the unrefined liquid from the unrefined liquid heater 108 and are configured to separately and selectively provide the unrefined liquid. The first valve 112 and the second valve 114 may each be, for example, solenoid valves, globe valves, ball valves, gate valves, diaphragm valves, electronically controlled valves (e.g., by the same controller configured to control the unrefined liquid pump 106, etc.), and other similar valves.

The refining system 100 also includes a impurities heat exchanger 116. In some embodiments, the impurities heat exchanger 116 is a single pass shell and tube heat exchanger. The impurities heat exchanger 116 is configured to selectively receive the unrefined liquid from the first valve 112. The impurities heat exchanger 116 functions to selectively transfer heat to the unrefined liquid within the impurities heat exchanger 116. By controlling the first valve 112, more or less of the unrefined liquid can be provided to the impurities heat exchanger 116.

The refining system 100 also includes a auxiliary heat exchanger 118. In some embodiments, the auxiliary heat exchanger 118 is a single pass shell and tube heat exchanger. The auxiliary heat exchanger 118 is configured to selectively receive the unrefined liquid from the second valve 114. The auxiliary heat exchanger 118 functions to selectively transfer heat to the unrefined liquid within the auxiliary heat exchanger 118. By controlling the second valve 114, more or less of the unrefined liquid can be provided to the auxiliary heat exchanger 118.

The refining system 100 also includes a refined liquid heat exchanger 120. In some embodiments, the refined liquid heat exchanger 120 is a single pass shell and tube heat exchanger. The refined liquid heat exchanger 120 is configured to selectively receive the unrefined liquid from each of the impurities heat exchanger 116 and the auxiliary heat exchanger 118. The refined liquid heat exchanger 120 functions to selectively transfer heat to the unrefined liquid within the refined liquid heat exchanger 120.

The refined liquid heat exchanger 120 selectively provides the unrefined liquid to a Peltier heat exchanger 122. The Peltier heat exchanger 122 functions to selectively transfer heat to the unrefined liquid within the Peltier heat exchanger 122 both by conventional heat transfer from a vapor routed next to, or around, the unrefined liquid within the Peltier heat exchanger 122, and by Peltier cells within the Peltier heat exchanger 122 that provide additional heating to the unrefined liquid. The Peltier heat exchanger 122 provides the unrefined liquid to a nozzle 124 within an evaporation tank 126. In some embodiments, the Peltier heat exchanger 122 is insulated (e.g., wrapped in thermal matting, wrapped in thermal insulation, etc.).

The refining system 100 is defined by a controlled pressure within the evaporation tank 126. The controlled pressure within the evaporation tank 126 may be controlled so that the boiling point of the unrefined liquid is a target temperature. This facilitates boiling of the unrefined liquid within the evaporation tank 126 based upon characteristics of the unrefined liquid. In applications where the unrefined liquid is salt water or seawater, the target temperature may be selected in order to minimize the formation of scale within the evaporation tank 126 due to the boiling of the unrefined liquid. In such applications, the target temperature may be 91° C. and the controlled pressure within the evaporation tank 126 may be approximately (e.g., within 10% of, etc.) 550 millimeters of mercury (mmHg). The controlled pressure may be determined empirically (e.g., during testing of the refining system 100, etc.).

In some embodiments, the refining system 100 includes a second sensor 128 positioned between the Peltier heat exchanger 122 and the evaporation tank 126 and configured to determine the temperature of the unrefined liquid between the Peltier heat exchanger 122 and the evaporation tank 126. The second sensor 128 may be, for example, a RTD. The second sensor 128 may be configured to provide the temperature of the unrefined liquid between the Peltier heat exchanger 122 and the evaporation tank 126 to the same controller that is configured to control the unrefined liquid pump 106.

In some embodiments, the refining system 100 includes a third sensor 130 positioned between the Peltier heat exchanger 122 and the evaporation tank 126 and configured to determine the pressure of the unrefined liquid between the Peltier heat exchanger 122 and the evaporation tank 126. The third sensor 130 may be, for example, a pressure transducer. The third sensor 130 may be configured to provide the pressure of the unrefined liquid between the Peltier heat exchanger 122 and the evaporation tank 126 to the same controller that is configured to control the unrefined liquid pump 106.

The nozzle 124 sprays (e.g., disperses, ejects, etc.) the unrefined liquid received from the Peltier heat exchanger 122 into the evaporation tank 126. The refining system 100 may be configured such that the unrefined liquid sprayed from the nozzle 124 has a temperature of approximately (e.g., within 5% of, etc.) 91° C. By spraying the unrefined liquid, the nozzle 124 reduces the amount of heat of vaporization of the unrefined liquid, thereby reducing the energy required to operate the refining system 100 and increasing the efficiency of the refining system 100. Some of the unrefined liquid evaporate into vapor shortly after being sprayed from the nozzle 124 (e.g., before contacting the evaporation tank 126, etc.). For example, the unrefined liquid may flash boil when sprayed into the evaporation tank 126. Unrefined liquid sprayed from the nozzle 124 that contacts the evaporation tank 126 may be collected within the evaporation tank 126 and may boil. As shown in FIG. 1, the Peltier heat exchanger 122 is not contained within (e.g., is separate from, is external to, is outside of, etc.) the evaporation tank 126.

In some embodiments, the refining system 100 includes a fourth sensor 132 positioned within the evaporation tank 126 and configured to determine the temperature of the air and/or vapor within the evaporation tank 126. The fourth sensor 132 may be, for example, a RTD. The fourth sensor 132 may be configured to provide the temperature of the air and/or vapor within the evaporation tank 126 to the same controller that is configured to control the unrefined liquid pump 106.

In some embodiments, the refining system 100 includes a fifth sensor 134 positioned within the evaporation tank 126 and configured to determine the temperature of the collected unrefined liquid within the evaporation tank 126. The fifth sensor 134 may be, for example, a surface mount RTD. The fifth sensor 134 may be configured to provide the temperature of the unrefined liquid within the evaporation tank 126 to the same controller that is configured to control the unrefined liquid pump 106.

The vapor generated within the evaporation tank 126 may also heat droplets of the unrefined liquid as it is sprayed into the evaporation tank 126, thereby providing an additional heat source to the unrefined liquid. In some embodiments, the vapor generated within the evaporation tank 126 may be routed proximate the unrefined liquid sprayed into the evaporation tank 126 so as to facilitate mixing of the unrefined liquid and the vapor within the evaporation tank 126, thereby facilitating increased heating of the unrefined liquid within the evaporation tank 126.

The vapor generated within the evaporation tank 126 passes through an entrainment separator 136 (e.g., screen, etc.). The entrainment separator 136 functions to substantially prevent droplets of unpurified liquid sprayed from the nozzle 124 from flowing out of the evaporation tank 126 entrained in vapor. The entrainment separator 136 includes a solid plug 138 through which vapor may not pass such that vapor may only pass through the entrainment separator 136 by flowing around the solid plug 138. The solid plug 138 may be disposed along (e.g., centered on, etc.) a central axis of the entrainment separator 136. After passing through the entrainment separator 136, the vapor flows out of the evaporation tank 126 and into the Peltier heat exchanger 122.

In some embodiments, the refining system 100 includes a sixth sensor 140 positioned between the evaporation tank 126 and the Peltier heat exchanger 122 and configured to determine the temperature of the air and/or vapor between the evaporation tank 126 and the Peltier heat exchanger 122. The sixth sensor 140 may be, for example, a RTD. The sixth sensor 140 may be configured to provide the temperature of the air and/or vapor between the evaporation tank 126 and the Peltier heat exchanger 122 to the same controller that is configured to control the unrefined liquid pump 106.

The vapor and the unrefined liquid are kept (e.g., maintained, etc.) separate within the Peltier heat exchanger 122. Additionally, the Peltier heat exchanger 122 is configured to transfer heat from the vapor to the unrefined liquid, thereby causing at least some of the vapor to condense into refined liquid and at least some of the heat of condensation of the vapor to remain in the Peltier heat exchanger (e.g., for transfer to unrefined liquid passing through the Peltier heat exchanger 122, etc.).

In some embodiments, the refining system 100 includes a seventh sensor 142 positioned within the Peltier heat exchanger 122 and configured to determine the temperature of the air and/or vapor within the Peltier heat exchanger 122. The seventh sensor 142 may be, for example, a surface mount RTD. The seventh sensor 142 may be configured to provide the temperature of the air and/or vapor within the Peltier heat exchanger 122 to the same controller that is configured to control the unrefined liquid pump 106.

The Peltier heat exchanger 122 provides refined liquid to a liquid separator 144. While two lines are shown in FIG. 1 between the Peltier heat exchanger 122 and the liquid separator 144, one for vapor and one for refined liquid, it is understood that only a single conduit may be used between the Peltier heat exchanger 122 and the liquid separator 144 (e.g., for providing refined liquid from the Peltier heat exchanger 122 to the liquid separator 144, etc.).

In various embodiments, the refining system 100 also includes a vacuum pump 146. The liquid separator 144 functions to separate the refined liquid from the vacuum pump 146. The vacuum pump 146 is configured to establish the controlled pressure within the evaporation tank 126 that is required such that the boiling point of the unrefined liquid is the target temperature.

By decreasing the controlled pressure within the evaporation tank 126, the vacuum pump 146 correspondingly decreases the boiling point of the unrefined liquid. By decreasing the boiling point of the unrefined liquid, evaporation of the unrefined liquid within the evaporation tank 126 can produce less scale, thereby facilitating repeated use of the refining system 100 without frequent cleaning (e.g., to remove scale, etc.).

The vacuum pump 146 may also be configured to remove dissolved air from the unrefined liquid tank 102 to perform degassing. The refining system 100 may include the vacuum pump 146 when the unrefined liquid is salt water or seawater and may not include the vacuum pump 146 when the unrefined liquid is not salt water or seawater.

In some embodiments, the refining system 100 does not include the vacuum pump 146 and the evaporation tank 126 is not degassed. For example, the refining system 100 may not include the vacuum pump 146 when the unrefined liquid is alcohol. In these embodiments, control of the boiling point of the unrefined liquid using the vacuum pump 146 is not possible. However, because the vacuum pump 146 is not included, less energy may be required to operate the refining system 100 in these embodiments.

In some embodiments, the refining system 100 includes an eighth sensor 148 positioned between the liquid separator 144 and the vacuum pump 146 and configured to determine a pressure of the air and/or vapor between the liquid separator 144 and the vacuum pump 146. The eighth sensor 148 may be, for example, a pressure transducer. The eighth sensor 148 may be configured to provide the pressure of the air and/or vapor between the liquid separator 144 and the vacuum pump 146 to the same controller that is configured to control the unrefined liquid pump 106.

The refined liquid heat exchanger 120 receives the refined liquid from the liquid separator 144 and is configured to transfer heat from the refined liquid to unrefined liquid within the refined liquid heat exchanger 120. In this way, refined liquid is used to heat the unrefined liquid prior to the unrefined liquid being provided to the Peltier heat exchanger 122 and the heat of vaporization of the unrefined liquid is conserved because an additional portion of the heat utilized to boil the unrefined liquid and produce the refined liquid is transferred to the unrefined liquid, thereby pre-heating the unrefined liquid for subsequent boiling. The refined liquid and the unrefined liquid are kept separate within the refined liquid heat exchanger 120.

The refined liquid heat exchanger 120 provides the refined liquid to the auxiliary heat exchanger 118. The auxiliary heat exchanger 118 is configured to transfer heat from the refined liquid to unrefined liquid within the auxiliary heat exchanger 118. In this way, refined liquid is used to heat the unrefined liquid prior to the unrefined liquid being provided to the refined liquid heat exchanger 120 and the heat of vaporization of the unrefined liquid is conserved because an additional portion of the heat utilized to boil the unrefined liquid and produce the refined liquid is transferred to the unrefined liquid, thereby pre-heating the unrefined liquid for subsequent boiling. The refined liquid and the unrefined liquid are kept separate within the auxiliary heat exchanger 118. The refined liquid heat exchanger 120 provides the refined liquid to a refined liquid outlet 150. The refined liquid outlet 150 provides the refined liquid to downstream components (e.g., storage tanks, etc.) of the refining system 100.

The evaporation tank 126 provides impurities to the impurities heat exchanger 116. The impurities heat exchanger 116 is configured to transfer heat from the impurities to unrefined liquid within the impurities heat exchanger 116. In this way, the impurities are used to heat the unrefined liquid prior to the unrefined liquid being provided to the refined liquid heat exchanger 120 and the heat of vaporization of the unrefined liquid is conserved because an additional portion of the heat utilized to boil the unrefined liquid and produce the impurities is transferred to the unrefined liquid, thereby pre-heating the unrefined liquid for subsequent boiling. The impurities and the unrefined liquid are kept separate within the impurities heat exchanger 116. The impurities heat exchanger 116 provides the impurities to an impurities outlet 152. The impurities outlet 152 provides the impurities to downstream components (e.g., evaporation trays, brine processing equipment, etc.) or rejects the impurities from the refining system 100 (e.g., into the ocean, etc.)

The refining system 100 receives unrefined liquid from an unrefined liquid source, heats the unrefined liquid within the unrefined liquid heater 108, heats the unrefined liquid within the impurities heat exchanger 116 using the impurities from the evaporation tank 126, heats the unrefined liquid within the auxiliary heat exchanger 118 using refined liquid from the refined liquid heat exchanger 120, heats the unrefined liquid within the refined liquid heat exchanger 120 using refined liquid from the liquid separator 144, and heats the unrefined liquid within the Peltier heat exchanger 122. In this way, the refining system 100 provides several discrete locations where unrefined liquid is heated (e.g., in a stepped fashion, etc.) using energy that is recovered from vapor, refined liquid, and impurities, thereby increasing the efficiency of the refining system 100. In some embodiments, the efficiency of the refining system 100 is greater than 150% (e.g., 157%, etc.).

In various embodiments, 30%-50% of the unrefined liquid (e.g., by volume, by mass, etc.) sprayed into the evaporation tank 126 is transformed into vapor whereas 50%-70% is left as impurities. The amount of unrefined liquid that is transformed into vapor may be increased or decreased by changing the target temperature and the controlled pressure. For example, by decreasing the controlled pressure and keeping the target temperature constant, the percentage of unrefined liquid that is transformed into vapor may increase. In some embodiments, 40%-50% of the unrefined liquid sprayed into the evaporation tank 126 is transformed into vapor whereas 50%-60% is left as impurities.

In embodiments where the unrefined liquid is salt water or seawater, the refining system 100 may pass the salt water or seawater through a sand filter prior to the entering the tank inlet 104. The sand filter may be configured based on the nozzle 124 (e.g., based on an aperture size of the nozzle 124, etc.). Additionally, where the unrefined liquid is salt water or seawater, the refining system 100 is capable of operating without pre-treating of components (e.g., membranes, etc.) as is required in typical systems.

In embodiments where the unrefined liquid is salt water or seawater, the refining system 100 may include a treatment system that dissolves scale within the refining system 100. The treatment system may periodically flush the refining system 100 with a treatment (e.g., sulfuric acid, etc.) that causes scales to dissolve. The dissolved scales may exit the refining system 100 along with the impurities.

In various embodiment, the unrefined liquid heater 108, the impurities heat exchanger 116, the auxiliary heat exchanger 118, and the refined liquid heat exchanger 120 cooperate to provide the unrefined liquid to the Peltier heat exchanger 122 at a temperature of approximately 89° C. (e.g., 88.5° C., 89° C., 89.5° C., etc.). In this embodiment, the Peltier heat exchanger 122 provides unrefined liquid to the nozzle 124 at a temperature of 91° C. and receives vapor and refined liquid at a temperature of approximately 91° C. (e.g., 90.5° C., 91° C., 91.5° C., etc.). In this way, the Peltier heat exchanger 122 only has to heat the unrefined liquid 1° C. or 2° C. and therefore only requires a minimal amount of electricity. As a result, the refining system 100 is able to obtain relatively high efficiency because the input to the refining system 100 is minimized. In these embodiments, the unrefined liquid may be salt water or seawater.

The Peltier heat exchanger 122 is defined by a capacity to process unrefined liquid. The capacity to process unrefined liquid of the Peltier heat exchanger 122 is a function of the droplet size of the unrefined liquid sprayed into the evaporation tank 126 by the nozzle 124, the rate of flow (e.g., mass flow rate, volumetric flow rate, etc.) of the unrefined liquid through the Peltier heat exchanger 122, and the controlled pressure of the vacuum pump 146.

Figure 2:
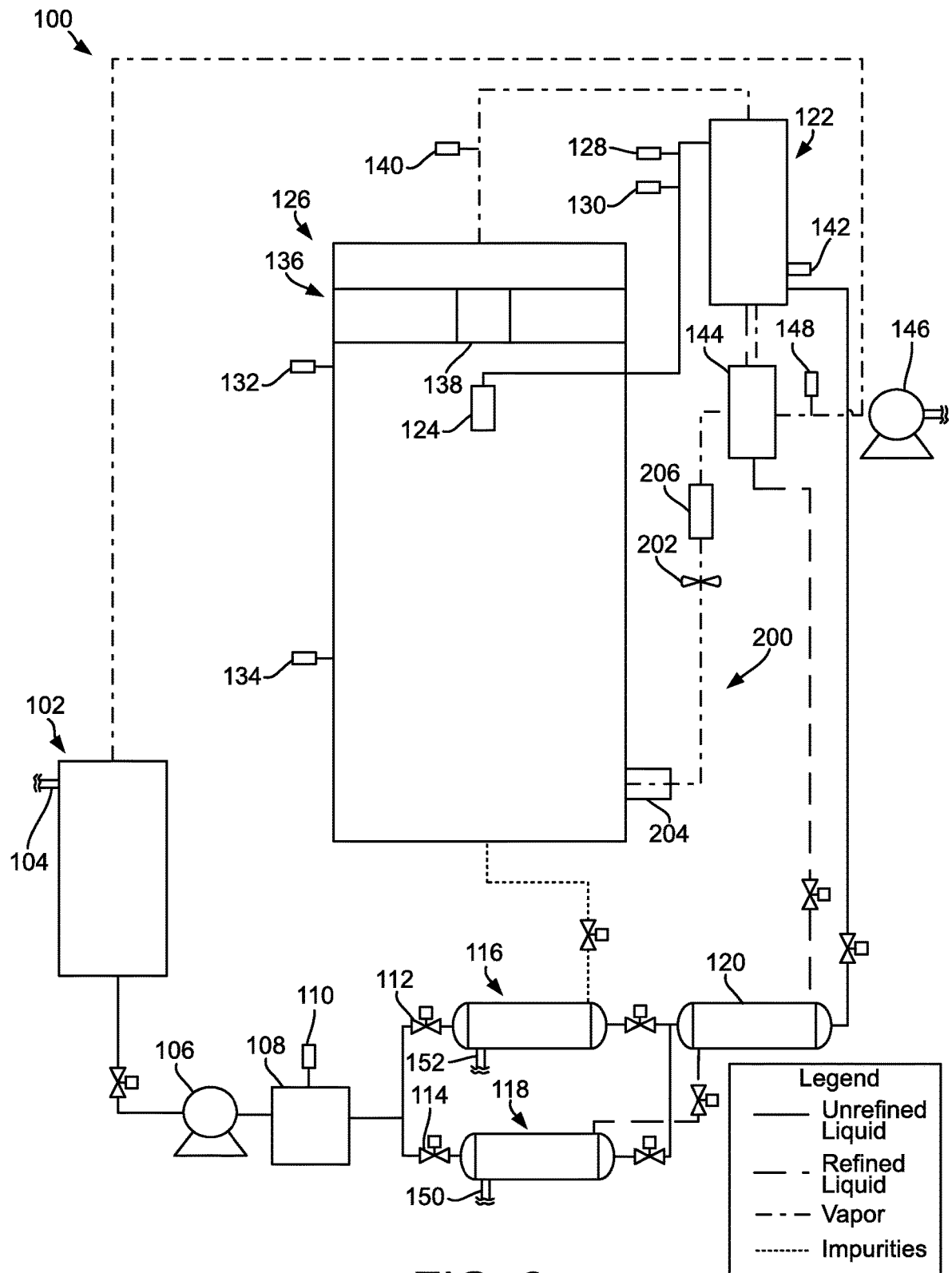
FIG. 2 is a block schematic diagram of another example refining system.

FIG. 2 illustrates the refining system 100 in some embodiments. In these embodiments, the refining system 100 includes a heat assist system 200. The heat assist system 200 is configured to provide additional heat to the unrefined liquid within the evaporation tank 126 in order to cause additional evaporation of the unrefined liquid, thereby forming additional vapor and potentially forming additional refined liquid.

The heat assist system 200 includes a fan 202. The fan 202 circulates residual vapor of the refining system 100 from the liquid separator 144. The fan 202 may be, for example, an axial fan or a centrifugal fan. The fan 202 provides the air and/or vapor to the evaporation tank 126. As shown in FIG. 2, the heat assist system 200 includes a fitting 204 that is coupled to a lower end of the evaporation tank 126. The fitting 204 is coupled to the evaporation tank 126 such that air and/or vapor provided by the heat assist system 200 may interact with unrefined liquid within the evaporation tank 126 for as long as possible. Specifically, due to the natural rise of air and/or vapor, it is helpful to provide the air and/or vapor into the evaporation tank 126 at a lower location in order to maximize the time that the air and/or vapor is exposed to the unrefined liquid, and therefore to maximize the heat transfer from the air and/or vapor to the unrefined liquid.

The heat assist system 200 also includes a vapor heater 206. The vapor heater 206 may be, for example, a resistance heater. The vapor heater 206 is configured to heat the air and/or vapor received from the liquid separator 144 prior to the air and/or vapor being received by the fan 202 and subsequently provided into the evaporation tank 126.

While only a single line for vapor is shown in FIG. 2 as extending from the evaporation tank 126 into the fitting 204 and towards the fan 202, it is understood that unrefined liquid may also be present within this single conduit (e.g., if the level of unrefined liquid within the evaporation tank 126 is above the fitting 204, etc.).

Figure 3:
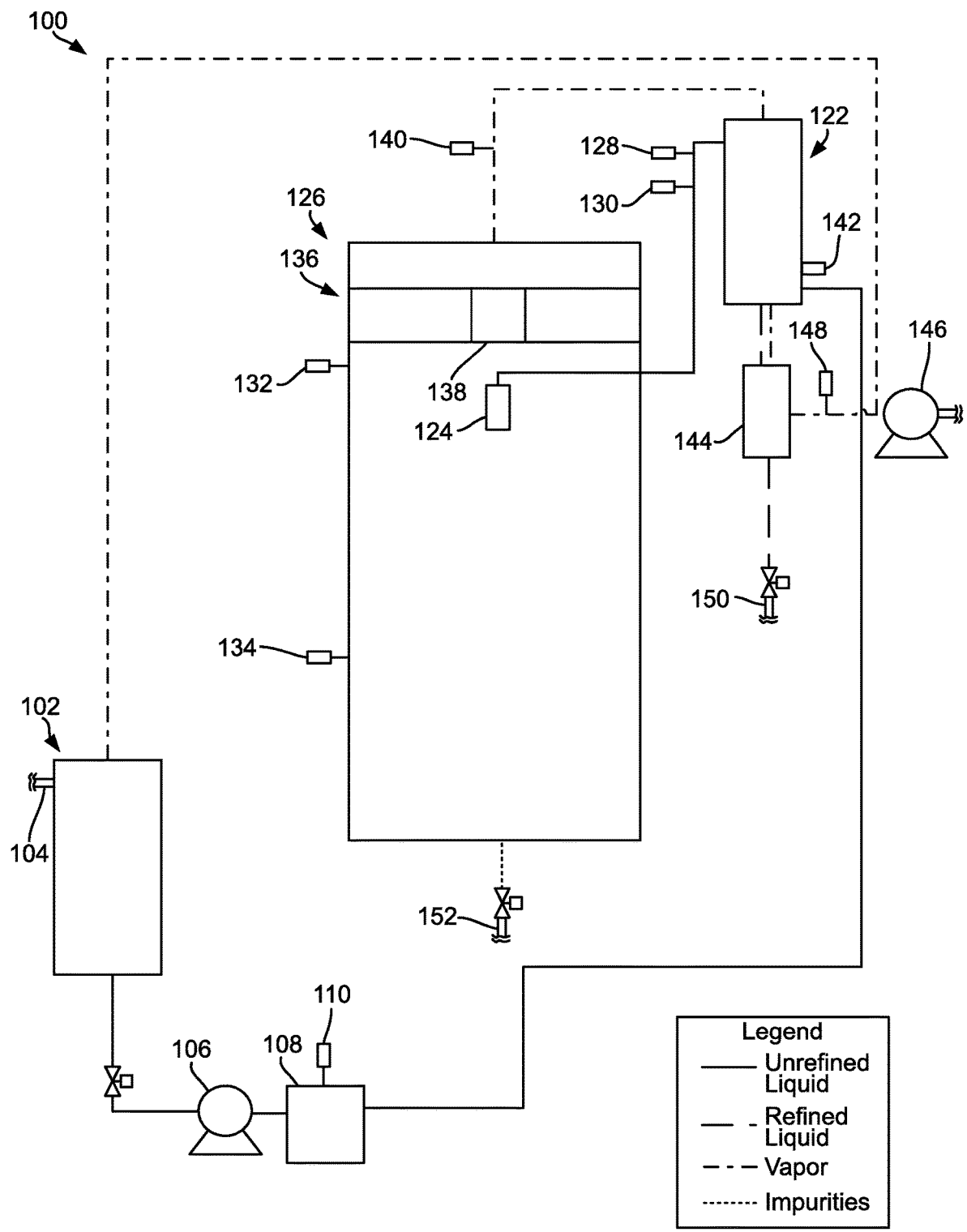
FIG. 3 is a block schematic diagram of yet another example refining system.
Figure 4:
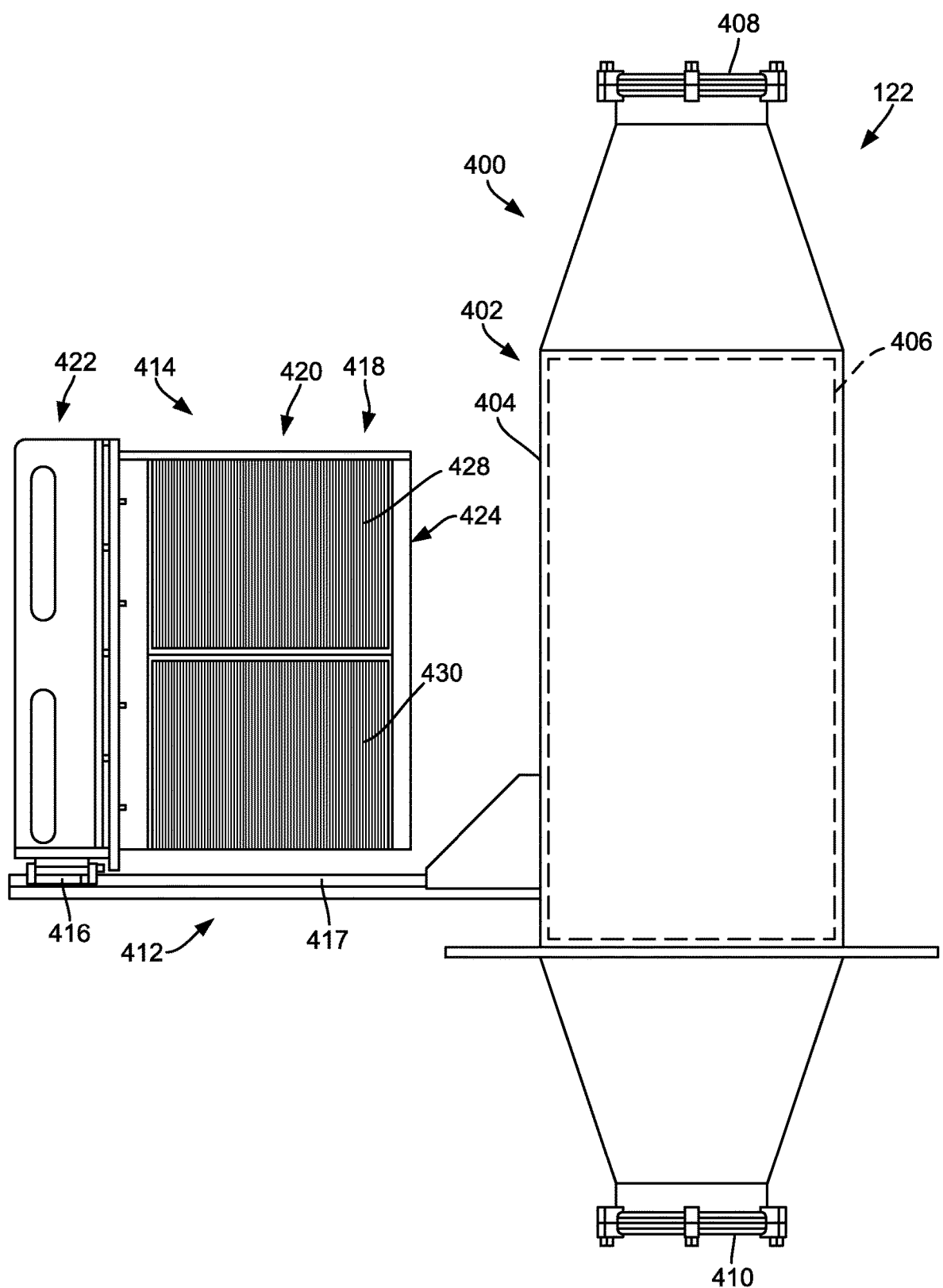
FIG. 4 is a front view of an example Peltier heat exchanger for a refining system.
Figure 5:
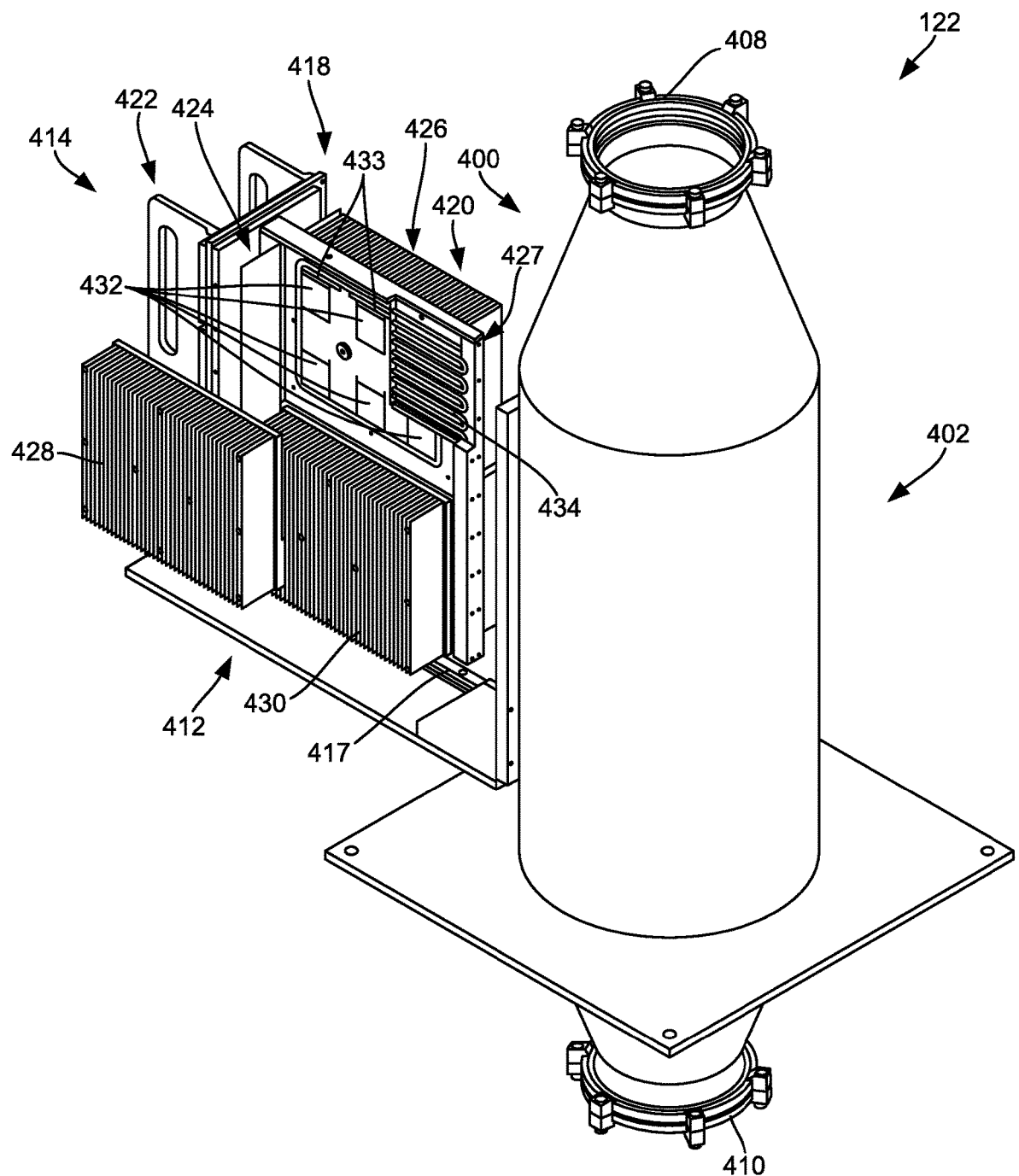
FIG. 5 is a top perspective view of the Peltier heat exchanger shown in FIG. 4 with some components hidden and some components shown in suspension.
Figure 6:
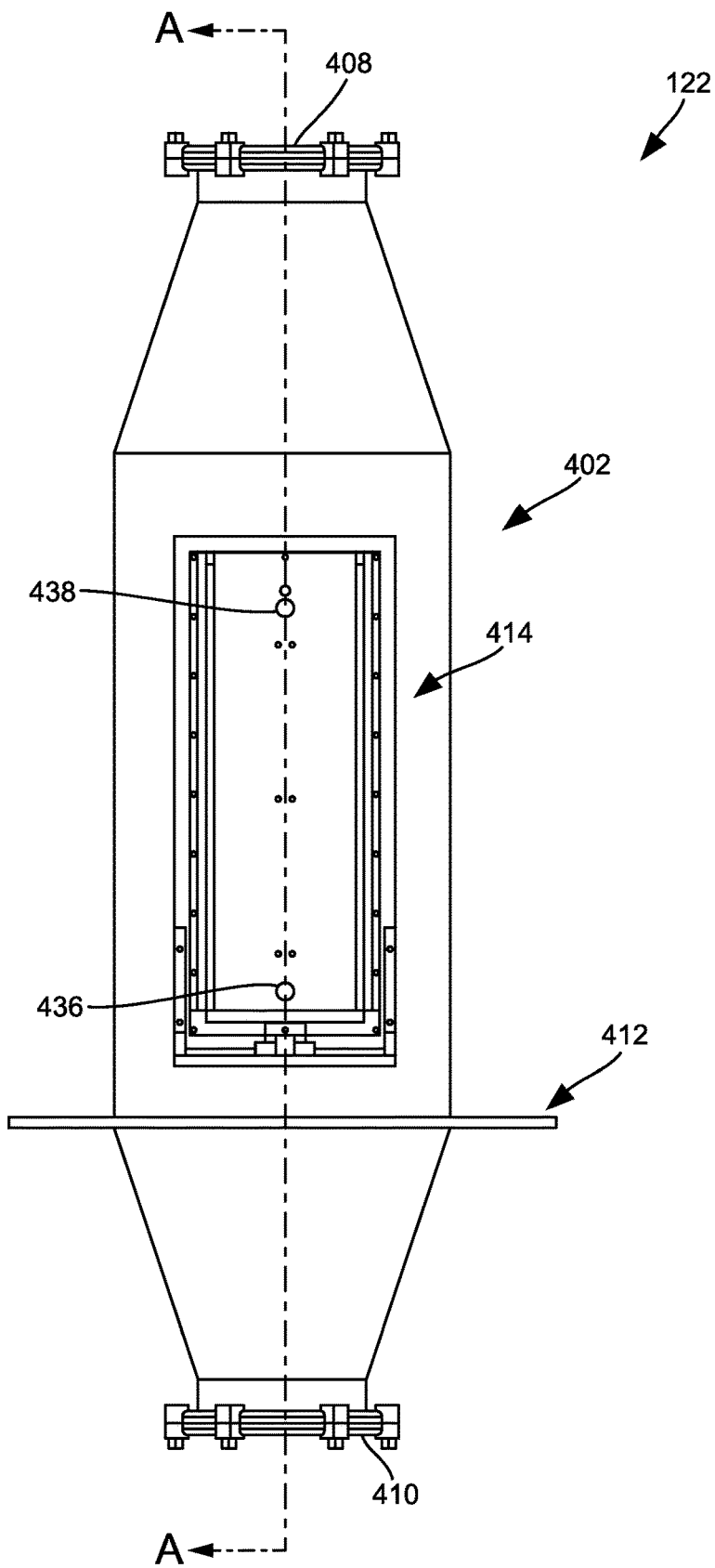
FIG. 6 is a side view of the Peltier heat exchanger shown in FIG. 4.

FIG. 3 illustrates the refining system 100 in some embodiments. In these embodiments, the refining system 100 does not include the first valve 112, the second valve 114, the impurities heat exchanger 116, the auxiliary heat exchanger 118, or the refined liquid heat exchanger 120. As a result, the unrefined liquid heater 108 provides the unrefined liquid directly to the Peltier heat exchanger 122, the liquid separator 144 provides the refined liquid directly to the refined liquid outlet 150, and the evaporation tank 126 provides the impurities directly to the impurities outlet 152. Such embodiments of the refining system 100 may be advantageous in applications where the financial cost and/or the physical size of the refining system 100 is constrained.

III. OVERVIEW OF EXAMPLE PELTIER HEAT EXCHANGER

FIGS. 4-9 illustrate the Peltier heat exchanger 122 in greater detail, according to some embodiments. The Peltier heat exchanger 122 includes a body 400. The body 400 may be constructed from, for example, metal (e.g., aluminum, stainless steel, etc.). The body 400 includes a central portion 402. The central portion 402 is generally cylindrical. In some embodiments, the central portion 402 is 16 inches long. In some embodiments, the central portion 402 is constructed from 304 stainless steel piping. The central portion 402 defines an aperture 404 and a cavity 406 contiguous with the aperture 404 (e.g., such that the aperture 404 provides access to the cavity 406, etc.). The body 400 also defines a Peltier heat exchanger inlet 408 and a Peltier heat exchanger outlet 410. The Peltier heat exchanger inlet 408 and the Peltier heat exchanger outlet 410 are communicable with the cavity 406. The Peltier heat exchanger inlet 408 is configured to receive the vapor from the evaporation tank 126 and the Peltier heat exchanger outlet 410 is configured to provide the refined liquid and the at least one of air or vapor to the liquid separator 144.

The Peltier heat exchanger 122 also includes a tray 412. The tray 412 projects outward from the central portion 402 proximate the aperture 404. The Peltier heat exchanger 122 includes a module 414 that is coupled to the tray 412 via bearings 416 (e.g., ball bearings, etc.) that interface with a track 417 (e.g., caged ball linear track, etc.) on the tray 412. The module 414 is selectively repositionable along the track 417 from a first position—where the module 414 is positioned within the cavity 406 and the Peltier heat exchanger 122 is configured for use in the refining system 100—and a second position—where the module 414 is positioned at least partially outside of the cavity 406 and the Peltier heat exchanger 122 is configured for servicing (e.g., cleaning, replacement, repair, etc.).

The module 414 includes a chassis 418. The chassis 418 includes a core 420 and a handle 422. The core 420 has a first side 424, a second side 426, and a core body 427 therebetween. In various embodiments, the core 420 is configured such that the first side 424 is identical to the second side 426. The first side 424 includes an upper heat sink 428 and a lower heat sink 430. It is understood that, in other applications, the first side 424 may include only the upper heat sink 428 or may include three, four, six, or more heat sinks.

The upper heat sink 428 is coupled to a plurality of Peltier cells 432 positioned within the core body 427. In some embodiments, the first side 424 includes six Peltier cells 432. It is understood that in other applications, the first side 424 may include other than six Peltier cells 432 and may instead include, for example, one, two, three, four, five, ten, twelve, or more Peltier cells 432.

Each of the Peltier cells 432 is surrounded by an o-ring 433 (e.g., seal, gasket, etc.) that provides a seal between the upper heat sink 428 and the associated one of the Peltier cells 432. Each of the Peltier cells 432 is configured to be independent controlled by the same controller that is configured to control the unrefined liquid pump 106. For example, by regulating a voltage supplied to one of the Peltier cells 432, an amount of heating and cooling providing by the Peltier cell 432 can be varied. The handle 422 may function as a hand hold for a user to graph the module 414 for repositioning the module 414 along the tray 412 (e.g., between the first position and the second position, etc.).

Figure 7:
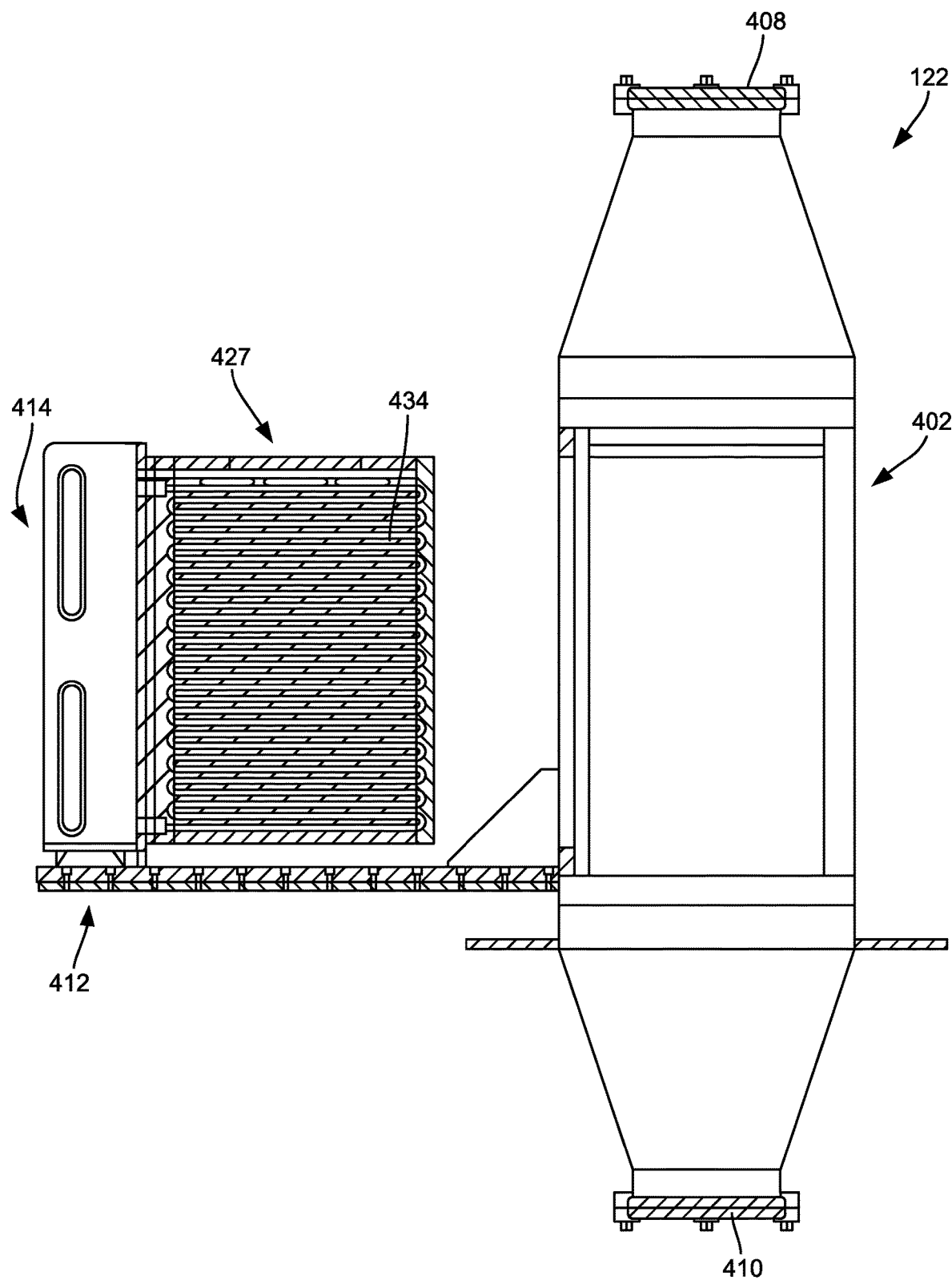
FIG. 7 is a cross-sectional view of the Peltier heat exchanger shown in FIG. 6 taken along plane A-A.

The plurality of Peltier cells 432 are in confronting relation with (e.g., are in contact with, are adjacent, etc.) an internal conduit 434 positioned within the core body 427 and separated from the upper heat sink 428 by the plurality of Peltier cells 432. The internal conduit 434 includes an internal conduit inlet 436 configured to receive unrefined liquid from the refined liquid heat exchanger 120 and an internal conduit outlet 438 configured to provide unrefined liquid to the nozzle 124. FIG. 7 is a cross-section of FIG. 6, taken about plane A-A, showing the internal conduit 434 within the core body 427. As shown, the internal conduit 434 is serpentine in shape.

The lower heat sink 430 is not coupled to Peltier cells. Instead, the lower heat sink 430 is coupled to a plate 440. The lower heat sink 430 functions to perform conventional heat exchange between unrefined liquid and vapor/refined liquid. In some embodiments, the plate 440 is an electroless plate (e.g., a nickel plated copper plate, etc.). The plate 440 separates the internal conduit 434 from the lower heat sink 430. In some embodiments, the first side 424 is configured to not include the plate 440 and instead includes a plurality of Peltier cells separating the lower heat sink 430 from the internal conduit 434.

While not shown in the Figures, it is understood that, in various embodiments, the second side 426 is identical to the first side 424 and includes an upper heat sink identical to the upper heat sink 428, a lower heat sink identical to the lower heat sink 430, a plurality of Peltier cells identical to the plurality of Peltier cells 432, a plurality of o-rings identical to the o-rings 433, and a plate identical to the plate 440.

In operation, unrefined liquid is passed through the internal conduit 434 while vapor is passed through the cavity 406. The Peltier cells 432 are controlled to cause simultaneous heating of the unrefined liquid within the internal conduit 434 and cooling of the vapor passing through the cavity 406. In this way, the Peltier cells 432 facilitate both condensation of vapor generated by the evaporation tank 126 and utilization of the heat of condensation of the vapor in the heating of the refined liquid. Due to the positioning of the Peltier cells 432, unrefined liquid is heated on one side (e.g., on the heated side, etc.) of the Peltier cells 432 while vapor is cooled on an opposite side (e.g., on the cooled side, etc.) of the Peltier cells 432.

Rather than utilizing the core body 427 and the internal conduit 434 as separate components, it is understood that the internal conduit 434 could be formed within the core body 427 (e.g., via a casting process etc.) in some embodiments.

Figure 8:
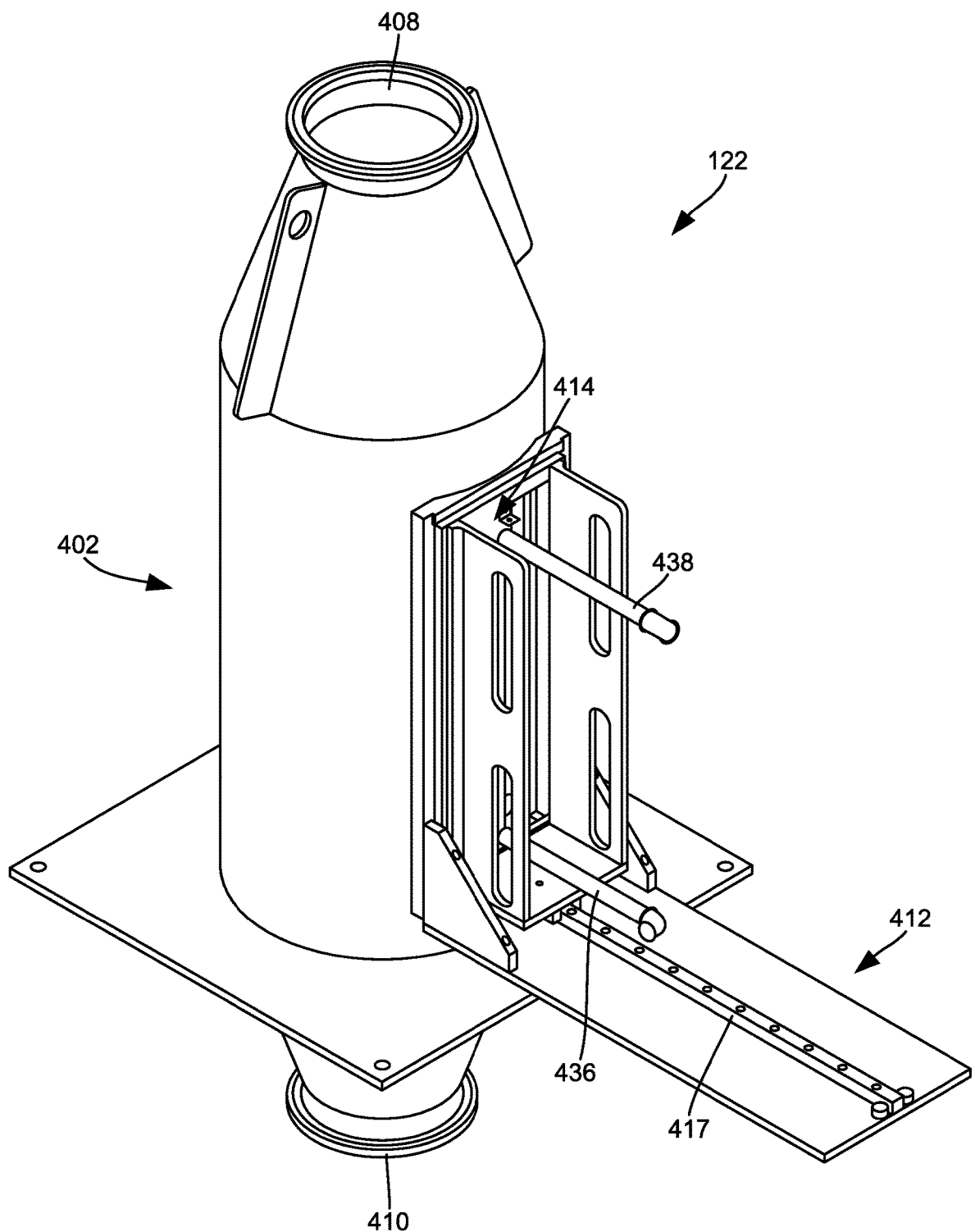
FIG. 8 is another perspective view of the Peltier heat exchanger shown in FIG. 4.

In FIG. 8, the Peltier heat exchanger 122 is shown with the module 414 in the first position—where the module 414 is positioned within the cavity 406 and the Peltier heat exchanger 122 is configured for use in the refining system 100.

Figure 9:
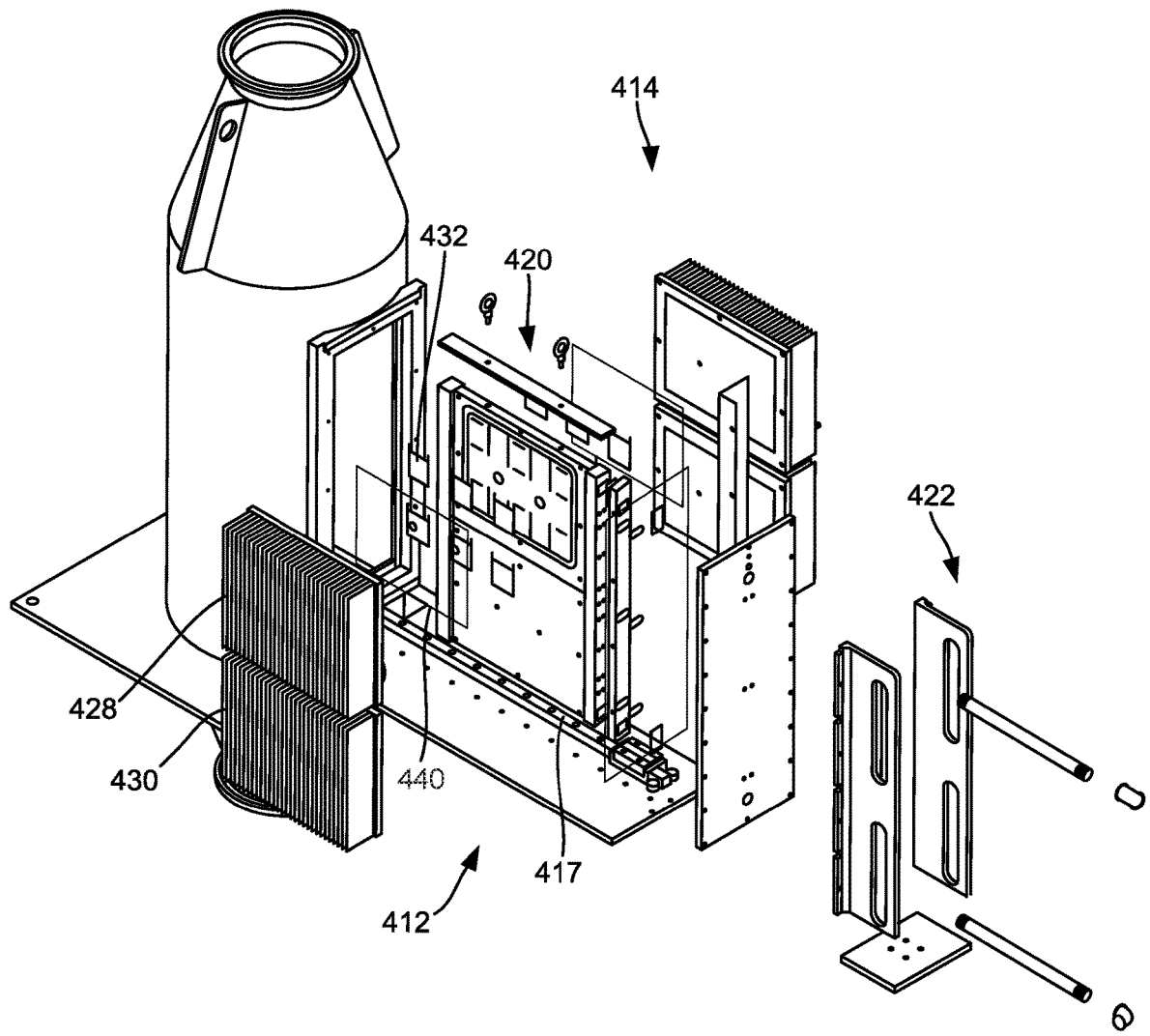
FIG. 9 is another perspective view of the Peltier heat exchanger shown in FIG. 4 with some components hidden and some components shown in suspension.

In FIG. 9, the Peltier heat exchanger 122 is shown in an exploded view. The module 414 also includes a main seal 442 for each heat sink. For example, where the module 414 includes the upper heat sink 428 and lower heat sink 430 on the first side 424 and two heat sinks on the second side 426, the module 414 includes four main seals 442. The main seals 442 substantially prevent fluid and/or vapor ingress between the heat sinks and the core 420. Similarly, the o-rings 433 substantially prevent fluid and/or vapor ingress between the Peltier cells 432 and the heat sinks. By combining the effects of the main seals 442 and the o-rings 433, the Peltier cells 432 are substantially isolated from fluid and/or vapor passing through the body 400. Protecting the Peltier cells 432 from contact with fluid and/or vapor prolongs the useful life of the Peltier heat exchanger 122 and reduces maintenance requirements.

IV. Overview of Example Controller for the Refining System

Figure 10:
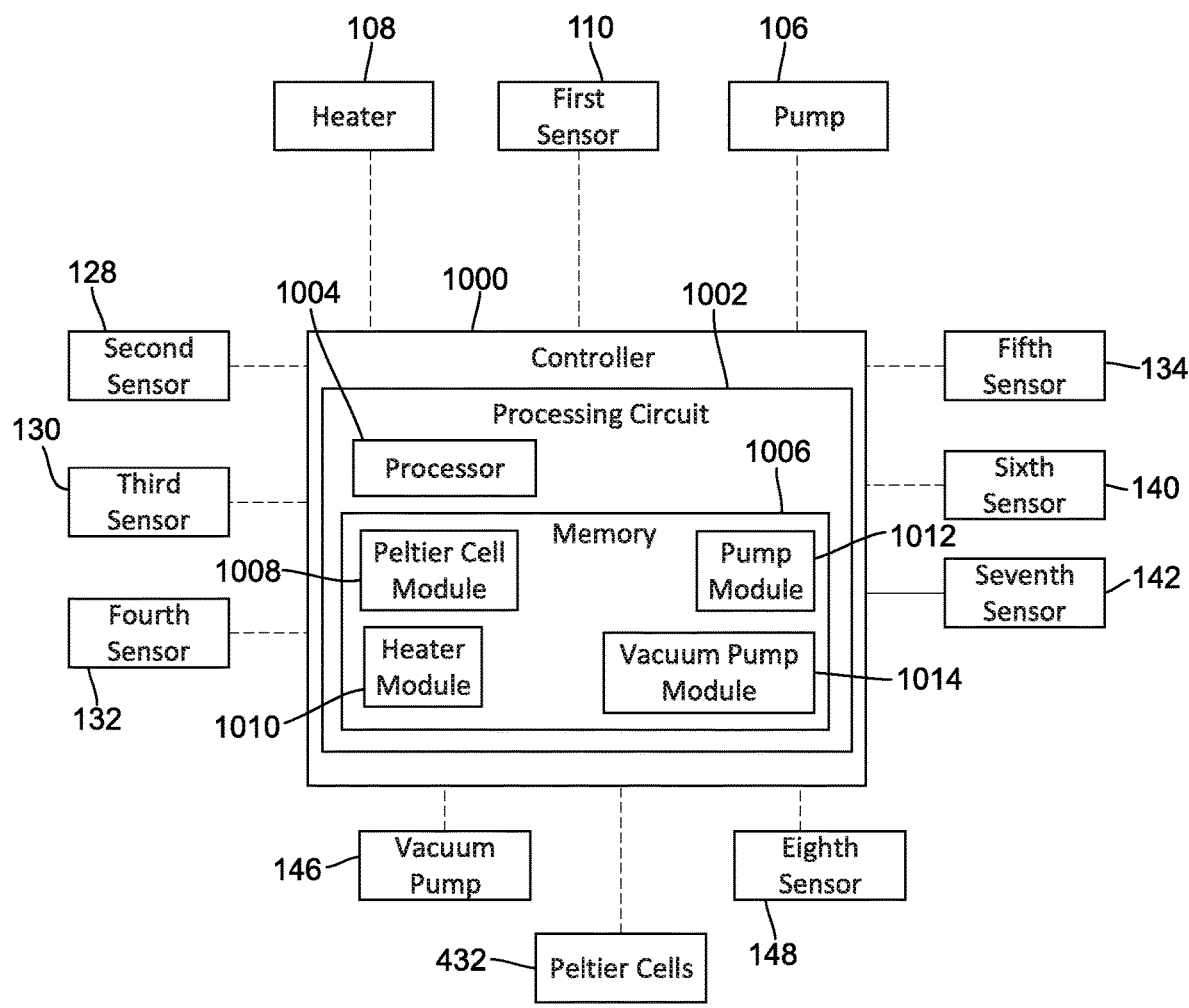
FIG. 10 is a block schematic diagram of an example controller for an example refining system.

FIG. 10 illustrates a controller 1000 (e.g., proportion, integral, derivative (PID) controller, etc.) for the refining system 100, according to various embodiments. In an example embodiment, the controller 1000 is electronically coupled to or communicable with the unrefined liquid pump 106, the unrefined liquid heater 108, the first sensor 110, the second sensor 128, the third sensor 130, the fourth sensor 132, the fifth sensor 134, the sixth sensor 140, the seventh sensor 142, the vacuum pump 146, the eighth sensor 148, and the Peltier cells 432.

The controller 1000 may control the unrefined liquid pump 106 to precisely pump unrefined liquid from the unrefined liquid tank 102. For example, a frequency of the unrefined liquid pump 106 may be controlled based on the target temperature by the controller 1000 using PID logic. The controller 1000 may control the unrefined liquid heater 108 to heat the unrefined liquid received by the unrefined liquid heater 108 from the unrefined liquid pump 106 to a target temperature when the refining system 100 is starting up. The controller 1000 may receive the temperature of the unrefined liquid within the unrefined liquid heater 108 from the first sensor 110. The controller 1000 may receive the temperature of the unrefined liquid between the Peltier heat exchanger 122 and the evaporation tank 126 from the second sensor 128. The controller 1000 may receive the pressure of the unrefined liquid between the Peltier heat exchanger 122 and the evaporation tank 126 from the third sensor 130. The controller 1000 may receive the temperature of the air and/or vapor within the evaporation tank 126 from the fourth sensor 132. The controller 1000 may receive the temperature of the unrefined liquid within the evaporation tank 126 from the fifth sensor 134. The controller 1000 may receive the temperature of the air and/or vapor between the evaporation tank 126 and the Peltier heat exchanger 122 from the sixth sensor 140. The controller 1000 may receive the temperature of the air and/or vapor within the Peltier heat exchanger 122 from the seventh sensor 142. The controller 1000 may receive the pressure of the air and/or vapor between the liquid separator 144 and the vacuum pump 146 from the eighth sensor 148. The controller 1000 may control the Peltier heat exchanger 122 such that Peltier cells 432 increase the temperature of the unrefined liquid enough to cause boiling of the unrefined liquid upon being sprayed into the evaporation tank 126.

The controller 1000 also includes a processing circuit 1002. The processing circuit 1002 includes a processor 1004 and a memory 1006. The processor 1004 may include, but is not limited to including, a microprocessor, an application-specific integrated circuit (ASIC), a field-programmable gate array (FPGA), etc., or combinations thereof.

The memory 1006 may include, but is not limited to, electronic, optical, magnetic, or any other storage or transmission device capable of providing the processor 1004 with program instructions. The memory 1006 may include, but is not limited to, electronic, optical, magnetic, or any other storage or transmission device capable of providing a processor, ASIC, FPGA, etc. with program instructions. For example, the memory 1006 may include, but is not limited to, a memory chip, Electrically Erasable Programmable Read-Only Memory (EEPROM), Erasable Programmable Read Only Memory (EPROM), flash memory, or any other suitable memory from which the associated controller can read instructions. The instructions may include code from any suitable programming language.

The memory 1006 includes a number of modules (e.g., microprocessors, application-specific integrated circuit, field-programmable gate arrays, etc.). The memory 1006 includes a Peltier cell module 1008, a heater module 1010, a pump module 1012, and a vacuum pump module 1014.

The Peltier cell module 1008 is configured to monitor the voltage and/or current of one or all of the Peltier cells 432 and to cause changes in the voltage and/or current of one or all of the Peltier cells 432. Specifically, the Peltier cell module 1008 is configured to control the Peltier cells 432 to attain steady state operation of the refining system 100. In steady state operation, energy input into the refining system 100 is minimized and stabilized. For example, the Peltier cell module 1008 may increase the voltage provided to the Peltier cells 432 if, for example, the temperature of the unrefined liquid provided from the unrefined liquid tank 102 decreases. In steady state operation, the Peltier cells 432 are providing only enough heat to the unrefined liquid entering the evaporation tank 126 so as to cause the unrefined liquid to boil within the evaporation tank 126 at a sufficient rate. In some embodiments, the energy input into the refining system 100 is of such a level so as to be supplied by a periodically operating solar energy collection system (e.g., photovoltaic cell, solar array, etc.). For example, the unrefined liquid heater 108 may be a solar heater.

The heater module 1010 is configured to cause changes to the heat provided by the unrefined liquid heater 108 to the unrefined liquid. For example, the heater module 1010 may command the unrefined liquid heater 108 to provide less heat to the unrefined liquid if the temperature of the unrefined liquid provided from the unrefined liquid tank 102 increases.

The pump module 1012 is configured to cause changes to the amount of unrefined liquid provided by the unrefined liquid pump 106 from the unrefined liquid tank 102. The vacuum pump module 1014 is configured to cause changes to the controlled pressure applied by the vacuum pump 146, and therefore control alter the ability of the nozzle 124 to perform spray evaporation of the unrefined liquid when the unrefined liquid is ejected from the nozzle 124 into the evaporation tank 126.

In an example embodiment, the unrefined liquid pump 106, the unrefined liquid heater 108, the vacuum pump 146, and the Peltier cells 432 are controlled by the controller 1000 such that, when the unrefined liquid entering the tank inlet 104 is salt water or seawater at 20° C., the temperature of the unrefined liquid between the Peltier heat exchanger 122 and the refined liquid heat exchanger 120 is 89° C.≤x<100° C. In this way, the Peltier cells 432 are not tasked with substantially raising (e.g., more than 0.5° C., more than 1° C., etc.) the temperature of the unrefined liquid prior to entry into the evaporation tank 126.

V. CONSTRUCTION OF EXEMPLARY EMBODIMENTS

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "approximately" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

It is important to note that the construction and arrangement of the systems shown in the various example implementations are illustrative only and are not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language "a portion" is used, the item can include a portion and/or the entire item unless specifically stated to the contrary.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

What is claimed is:

1. A refining system comprising:
   a Peltier heat exchanger configured to receive unrefined liquid and comprising a Peltier cell, a Peltier heat exchanger inlet, a Peltier heat exchanger outlet, and an internal conduit configured to receive the unrefined liquid;
   an evaporation tank; and
   a nozzle positioned within the evaporation tank and configured to receive the unrefined liquid from the internal conduit and provide the unrefined liquid into the evaporation tank such that vapor is formed;
   wherein the Peltier heat exchanger is further configured to receive the vapor from the evaporation tank via the Peltier heat exchanger inlet while simultaneously receiving the unrefined liquid, the Peltier heat exchanger further configured to provide the vapor via the Peltier heat exchanger outlet; and
   wherein the Peltier cell is configured to heat the unrefined liquid within the Peltier heat exchanger and cool the vapor within the Peltier heat exchanger simultaneously.

2. The refining system of claim 1, wherein the Peltier heat exchanger is not contained within the evaporation tank.

3. The refining system of claim 1, wherein the Peltier heat exchanger further comprises:
   a cavity configured to contain the vapor received from the evaporation tank; and
   an upper heat sink configured to be positioned at least partially within the cavity.

4. The refining system of claim 3, wherein the Peltier cell is disposed between the internal conduit and the upper heat sink such that the internal conduit is configured to be heated by the Peltier cell and the upper heat sink is configured to be cooled by the Peltier cell.

5. The refining system of claim 1, wherein the unrefined liquid is water.

6. The refining system of claim 1, further comprising:
   a vacuum pump configured to establish a controlled pressure within the evaporation tank; and
   a controller communicable with the vacuum pump, the controller comprising a memory and a processing circuit, the memory comprising a boiling point associated with the unrefined liquid, the processing circuit configured to determine the controlled pressure based on the boiling point and to control the vacuum pump to establish the controlled pressure.

7. The refining system of claim 6, further comprising:
   a liquid separator configured to receive refined liquid from the Peltier heat exchanger, receive the vapor from the Peltier heat exchanger, and provide the vapor to the vacuum pump;
   an unrefined liquid tank configured to receive the vapor from the liquid separator; and
   an unrefined liquid pump configured to receive the unrefined liquid from the unrefined liquid tank.

8. The refining system of claim 7, further comprising:
   an unrefined liquid heater configured to receive the unrefined liquid from the unrefined liquid pump and to heat the unrefined liquid; and
   an impurities heat exchanger configured to receive the unrefined liquid from the unrefined liquid heater, receive impurities from the evaporation tank, and to heat the unrefined liquid and cool the impurities simultaneously.

9. The refining system of claim 8, further comprising a refined liquid heat exchanger configured to receive the unrefined liquid from the impurities heat exchanger, receive the refined liquid from the liquid separator, provide the unrefined liquid to the Peltier heat exchanger, and to heat the unrefined liquid and cool the refined liquid simultaneously.

10. The refining system of claim 9, further comprising an auxiliary heat exchanger configured to receive the unrefined liquid from the unrefined liquid heater, provide the unrefined liquid to the refined liquid heat exchanger, receive the refined liquid from the refined liquid heat exchanger, and to heat the unrefined liquid and cool the refined liquid simultaneously.

11. The refining system of claim 7, further comprising a fan configured to cause the vapor to be drawn from the liquid separator and provided to the evaporation tank.

12. The refining system of claim 11, further comprising a vapor heater configured to receive the vapor from the liquid separator and provide the vapor to the evaporation tank;
wherein the fan is configured to cause the vapor to be provided to the vapor heater.

13. The refining system of claim 1, wherein:
the Peltier heat exchanger comprises:
a body comprising:
the Peltier heat exchanger inlet; and
the Peltier heat exchanger outlet; and
a module comprising:
an internal conduit inlet configured to receive the unrefined liquid;
an internal conduit outlet configured to provide the unrefined liquid;
a core body; and
an upper heat sink coupled to the core body and configured to interface with the vapor;
the internal conduit is positioned within the core body and configured to receive the unrefined liquid from the internal conduit inlet, to provide the unrefined liquid to the internal conduit outlet, and to route the unrefined liquid within the core body; and
the Peltier cell is disposed between the internal conduit and the upper heat sink, the Peltier cell configured to simultaneously heat the internal conduit and cool the upper heat sink.

14. The refining system of claim 13, wherein:
the body further comprises a cavity communicable with the Peltier heat exchanger inlet and the Peltier heat exchanger outlet;
the module is selectively disposed within the cavity; and
the upper heat sink is at least partially positioned within the cavity.

15. The refining system of claim 14, wherein:
the body further comprises a tray; and
the module is selectively repositionable between a first position where the module is positioned within the cavity and a second position where the module is positioned at least partially outside of the cavity.

16. The refining system of claim 13, wherein the unrefined liquid is water.

17. A method of purifying liquid using the refining system of claim 1, the method comprising:
receiving, by the Peltier heat exchanger, the unrefined liquid;
providing, by the Peltier heat exchanger, the unrefined liquid to the evaporation tank;
receiving, by the Peltier heat exchanger, the vapor from the evaporation tank;
heating, by the Peltier cell, the unrefined liquid within the Peltier heat exchanger while simultaneously cooling, by the Peltier cell, the vapor within the Peltier heat exchanger; and
providing, by the Peltier heat exchanger, refined liquid.

18. The method of claim 17, further comprising providing, by the evaporation tank, brine, separate from the vapor.

19. The method of claim 17, wherein the unrefined liquid is at least partially vaporized when the unrefined liquid is provided to the evaporation tank.

20. The method of claim 17, wherein the unrefined liquid is water.

* * * * *